2 Sheets--Sheet 1.

A. J. HEAVNER.
Hedge-Trimmers.

No. 153,953            Patented Aug. 11, 1874.

WITNESSES:

INVENTOR:

BY

ATTORNEYS.

2 Sheets--Sheet 2.

A. J. HEAVNER.
Hedge-Trimmers.

No. 153,953　　　　　　　　　　　　　　　Patented Aug. 11, 1874.

WITNESSES:　　　　　　　　　　　　　　　INVENTOR:
　　　　　　　　　　　　　　　　　　　　　A. J. Heavner
　　　　　　　　　　　　　　　　　　BY
　　　　　　　　　　　　　　　　　　　　　ATTORNEYS.

THE GRAPHIC CO. PHOTO-LITH. 39 & 41 PARK PLACE, N.Y.

UNITED STATES PATENT OFFICE.

ANDREW J. HEAVNER, OF PITTSFIELD, ILLINOIS.

IMPROVEMENT IN HEDGE-TRIMMERS.

Specification forming part of Letters Patent No. 153,953, dated August 11, 1874; application filed April 25, 1874.

*To all whom it may concern:*

Be it known that I, ANDREW J. HEAVNER, of Pittsfield, in the county of Pike and State of Illinois, have invented a new and Improved Hedge-Trimmer; and I do hereby declare that the following is a full, clear, and exact description of the same, reference being had to the accompanying drawings, forming a part of this specification, in which—

Figure 1:
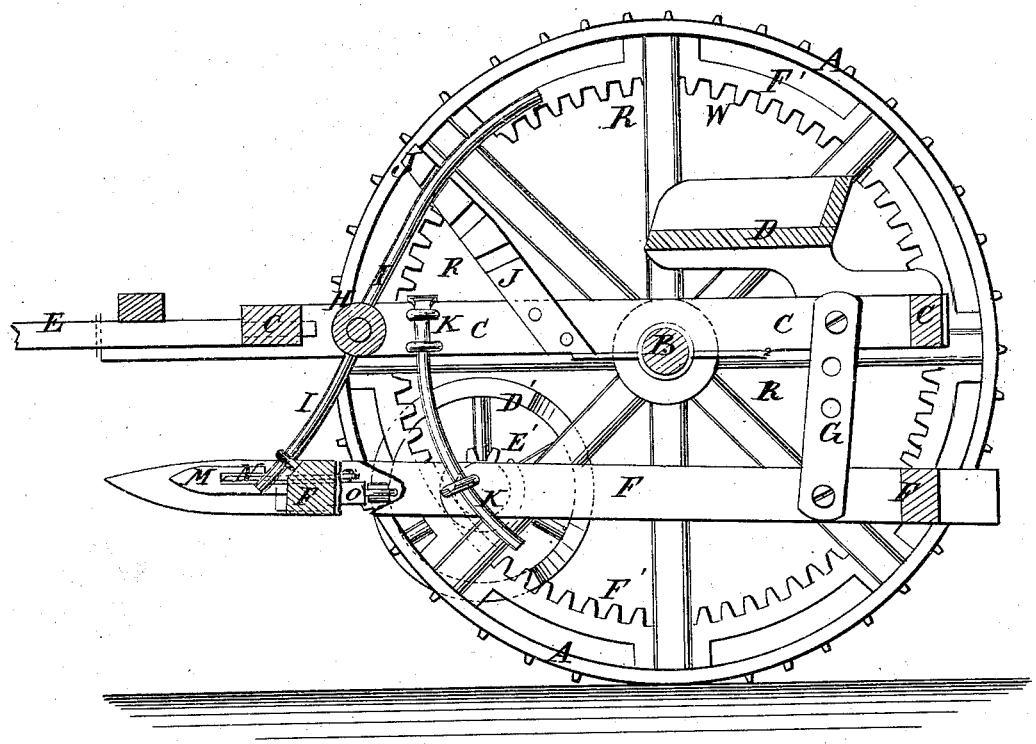
Figure 2:
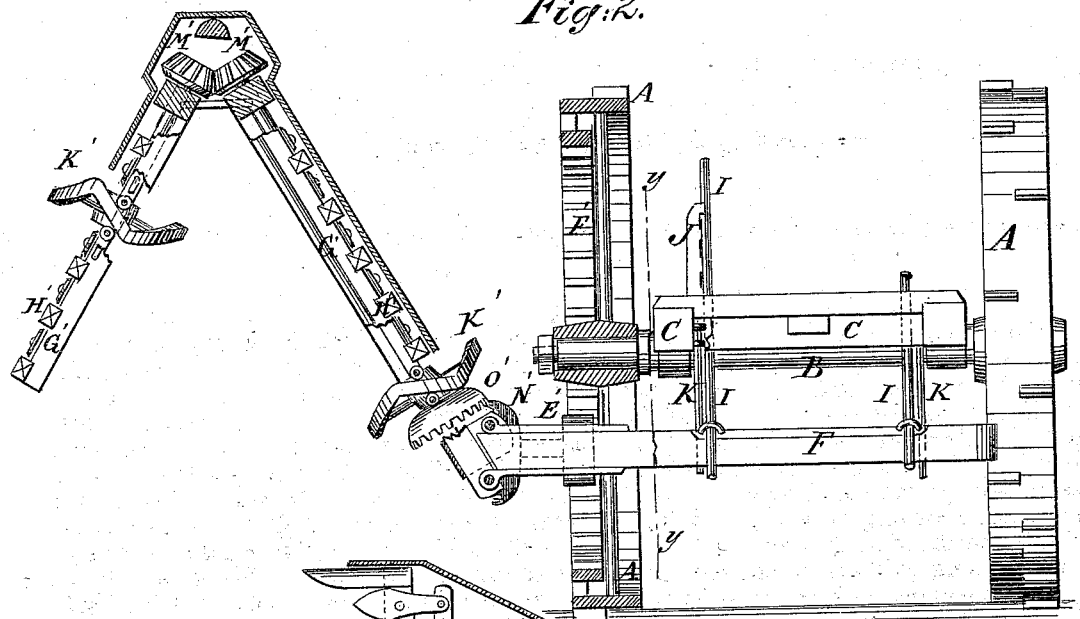
Figure 3:
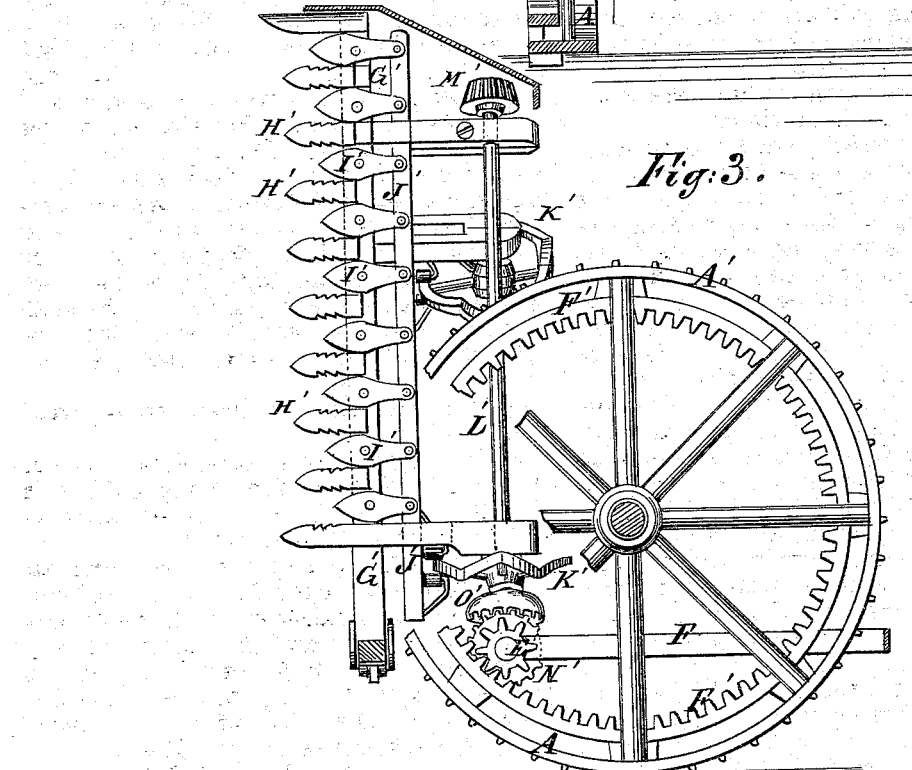

Figure 1 is a longitudinal sectional elevation; Fig. 2, a cross-section in front of the wheel; and Fig. 3, a side elevation.

The invention will first be fully described and then pointed out in the claims.

A are the drive-wheels, which turn with the axle B, that revolves in side-bars of frame C; D, the driver's seat; and E, the tongue. F is a frame consisting of three longitudinal bars connected by cross-bars, and so arranged that one of the drive-wheels A may be in the space between two longitudinal bars. The rear part of the frame F is suspended from the rear part of the frame C by two bars, G, the ends of which are pivoted to said frames. Several holes are formed in the bars G, to receive the pivoting-bolts, so that the rear end of the said suspended frame may be raised and lowered, as desired. To and between the forward parts of the side bars of the frame C is pivoted a roller, H, to which are rigidly attached two curved arms or levers, I, which pass through staples, or other keepers, attached to the front cross-bar of the frame F. The upper end of one of the levers I is extended upward and crosses the arm J, the lower end of which is rigidly attached to a side bar of the frame C, and has notches formed in it to receive and hold the said lever I. By this construction, by operating the lever I, the forward part of the suspended frame F may be raised and lowered as required, and, when adjusted, will be held securely in place. K are curved arms, the upper ends of which are rigidly attached to the side bars of the frame C, and which pass through keepers attached to the longitudinal bars of the frame F, so as to prevent any side movement of the forward part of the said frame F. H' are fingers, I' pivoted cutters, and J' a sickle-bar, which is made in two parts, meeting at the angle of the cutter-bar G' and working in bearings in the rearwardly-projecting ends of some of the fingers H', or in bars attached to the cutter-bar G'. Each part of the sickle-bar J' is vibrated by a zigzag wheel, K', which works in notches formed in, or between pins or rollers attached to, the said sickle-bar J' J'. The zigzag wheels K' are attached to shafts L', which work in bearings in the rearwardly-projecting ends of some of the fingers I', or in bars attached to said sickle-bar J' J'. The adjacent ends of the shafts L' meet at one angle, and to them are attached two bevel-gear wheels, M', the teeth of which mesh into each other, so that the outer shaft L' may be driven from the inner one.

Having thus described my invention, what I claim as new is—

1. The combination of frame F, pivoted bars G, levers I, rollers H, and curved guide-rods K, with the main frame C, substantially as and for the purpose described.

2. The combination of V-shaped cutter-bar G' provided with fingers H' and pivoted cutters I', the two sickle-bars J', the two shafts L', the two zigzag wheels K', the two pairs of bevel-gear wheels M' M' and N' O', and the gear-wheels E' F', with the suspended frame F, and the drive-wheel A, substantially as herein shown and described.

ANDREW J. HEAVNER.

Witnesses:
ALBERT ST. JOHN,
WILLIAM J. JOHNSON.